(12) United States Patent
Mallette et al.

(10) Patent No.: US 11,651,250 B2
(45) Date of Patent: May 16, 2023

(54) AUTOMATICALLY GENERATED CONVERSATION OUTPUT

(71) Applicant: INTERNATIONAL BUSINESS MACHINES CORPORATION, Armonk, NY (US)

(72) Inventors: Jennifer A. Mallette, Vienna, VA (US); Shuai Wang, Sunnyvale, CA (US); Steven Ware Jones, Astoria, NY (US); Ruchi Asthana, New York, NY (US); Jacob Lewis, New York, NY (US); Jia Liu, Astoria, NY (US); Vivek Salve, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 652 days.

(21) Appl. No.: 16/689,149

(22) Filed: Nov. 20, 2019

(65) Prior Publication Data
US 2021/0150385 A1    May 20, 2021

(51) Int. Cl.
*G06F 16/00* (2019.01)
*G06N 5/04* (2023.01)
*G06N 20/00* (2019.01)
*G06F 16/35* (2019.01)
*G06F 16/332* (2019.01)

(52) U.S. Cl.
CPC .......... *G06N 5/04* (2013.01); *G06F 16/3329* (2019.01); *G06F 16/353* (2019.01); *G06N 20/00* (2019.01)

(58) Field of Classification Search
CPC .......... G06N 5/04; G06N 20/00; G06N 20/10; G06F 16/3329; G06F 16/353
See application file for complete search history.

(56) References Cited

U.S. PATENT DOCUMENTS

| 8,666,730 | B2 | 3/2014 | Todhunter | |
|---|---|---|---|---|
| 8,788,263 | B1 | 7/2014 | Richfield | |
| 9,384,450 | B1 | 7/2016 | Cordes | |
| 10,726,204 | B2 * | 7/2020 | Crudele | G06F 40/226 |
| 10,963,497 | B1 * | 3/2021 | Tablan | G06F 16/3344 |

(Continued)

FOREIGN PATENT DOCUMENTS

CN    109857848 A    6/2019

OTHER PUBLICATIONS

Mell et al., "The NIST Definition of Cloud Computing", National Institute of Standards and Technology, Special Publication 800-145, Sep. 2011, 7 pages.

*Primary Examiner* — Noosha Arjomandi
(74) *Attorney, Agent, or Firm* — Rakesh Roy

(57) ABSTRACT

A computer-implemented method, a computer system, and a computer program product for automatically generated conversation output is provided. The present invention may include training an answer-intent classifier to associate an intent expressed in an example question with an example answer that is responsive to the example question. The present invention may further include classifying, using the trained answer-intent classifier, a content transmitted to the trained answer-intent classifier with the intent expressed in the example question in response to determining, using the trained answer-intent classifier, that the content includes relevant information for generating the example answer that is responsive to the example question.

17 Claims, 12 Drawing Sheets

(56) References Cited

U.S. PATENT DOCUMENTS

| | | |
|---|---|---|
| 2012/0059838 A1 | 3/2012 | Berntson |
| 2015/0066479 A1* | 3/2015 | Pasupalak ......... G06F 16/90332 |
| | | 704/9 |
| 2017/0206797 A1* | 7/2017 | Solomon ................ G06N 3/006 |
| 2017/0242886 A1 | 8/2017 | Jolley |
| 2018/0077088 A1* | 3/2018 | Cabrera-Cordon .......................... |
| | | G06F 16/90335 |
| 2018/0150607 A1* | 5/2018 | MacLeod ................ G16H 10/20 |
| 2018/0189656 A1* | 7/2018 | Church .................. G06Q 10/10 |
| 2019/0012390 A1* | 1/2019 | Nishant .................. G06N 3/006 |
| 2019/0042988 A1 | 2/2019 | Brown |
| 2019/0124020 A1 | 4/2019 | Bobbarjung |
| 2019/0266237 A1* | 8/2019 | Ray ....................... G10L 15/075 |
| 2019/0304157 A1* | 10/2019 | Amer ...................... G06V 20/41 |
| 2019/0325081 A1* | 10/2019 | Liu .......................... G06F 9/453 |
| 2019/0361977 A1* | 11/2019 | Crudele ................ G06F 40/226 |
| 2019/0371296 A1* | 12/2019 | Iwase ...................... G10L 15/30 |
| 2020/0020318 A1* | 1/2020 | Canada .................... G06N 5/04 |
| 2020/0034797 A1* | 1/2020 | Jonnalagadda .......... G06F 40/56 |
| 2020/0142959 A1* | 5/2020 | Mallinar ................ G06N 20/20 |
| 2020/0227026 A1* | 7/2020 | Rajagopal ............. G06F 16/244 |
| 2020/0311738 A1* | 10/2020 | Gupta ..................... G06F 16/22 |
| 2021/0004537 A1* | 1/2021 | Sapugay ............... G06F 16/686 |
| 2021/0150385 A1* | 5/2021 | Mallette .............. G06F 16/3329 |
| 2022/0351634 A1* | 11/2022 | Wen .................... G06F 16/3329 |

* cited by examiner

AUTOMATICALLY GENERATED CONVERSATION OUTPUT

BACKGROUND

The present invention relates generally to the field of computing, and more particularly to conversational artificial intelligence (AI) technology.

AI-based technologies provide computer-implemented operations which can emulate certain human cognitive functions. In some instances, AI-based technologies enable interactions between users and computer systems using human natural language. Computer systems employing conversational AI often process large amounts of natural language data in order to extract meaning from what a user is saying.

SUMMARY

Embodiments of the present invention disclose a computer-implemented method, a computer system, and a computer program product for automatically generated conversation output. The present invention may include training an answer-intent classifier to associate an intent expressed in an example question with an example answer that is responsive to the example question. The present invention may further include classifying, using the trained answer-intent classifier, a content transmitted to the trained answer-intent classifier with the intent expressed in the example question in response to determining, using the trained answer-intent classifier, that the content includes relevant information for generating the example answer that is responsive to the example question.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
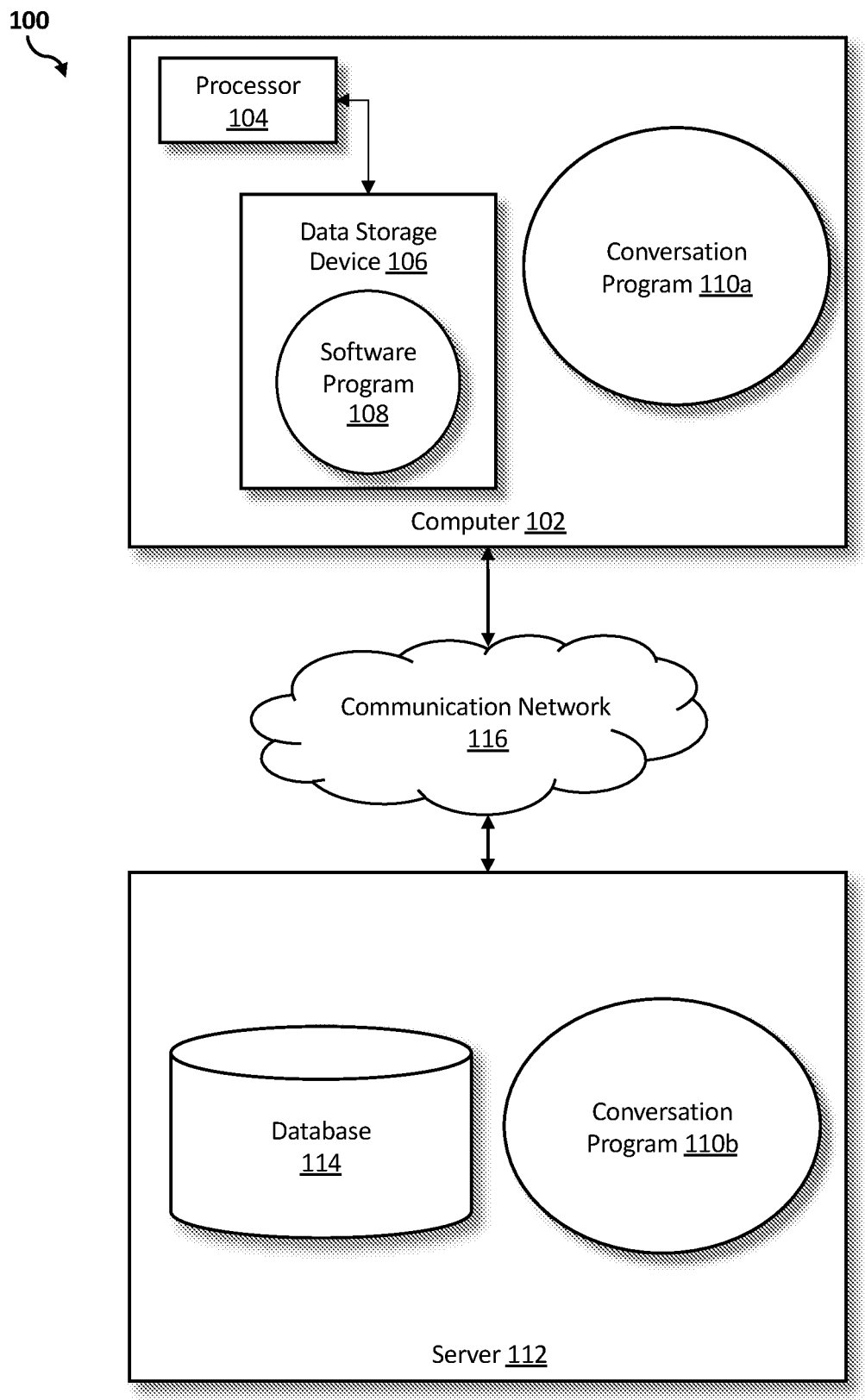
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Python, or the like, and procedural programming languages, such as the "C" programming language, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for automatically generating conversation output. As such, the present embodiment has the capacity to improve the technical field of conversational AI by automatically generating a natural language classifier for identifying the most relevant content for accurately responding to a conversation input from a user (e.g., user question, user utterance), based on a goal or purpose (i.e., intent) of the conversation input. More specifically, a cognitive or AI-based conversation program may use historical chat transcripts to train a natural language classifier to identify various intents expressed in user utterances during a conversation. Then, the conversation program may use the historical chat transcripts to train the natural language classifier to associate an identified intent of a user utterance with a respective answer responding to the user utterance. As such, the conversation program may train the natural language classifier to associate the identified intent with a relevant content (e.g., responsive information) included in the respective answer. Thereafter, the trained natural language classifier may be implemented on a set of data to detect content which may include relevant information for responding to user utterances, based on the identified intent of the user utterance.

As described previously, AI-based technologies provide computer-implemented operations which can emulate certain human cognitive functions. In some instances, AI-based technologies enable interactions between users and computer systems using human natural language. Computer systems employing conversational AI often process large amounts of natural language data in order to extract meaning from what a user is saying.

Cognitive conversation systems may include AI-based software, such as, for example, chatbots, virtual assistants, and conversational agents. According to embodiments of the present disclosure, chatbots, virtual assistants, and conversational agents may include programs which recognize and understand the intent of a conversation input (e.g., utterance from a user) and may automatically generate an accurate conversation output (e.g., response) based at least on the recognized and understood intent. In some embodiments, conversation programs may additionally extract one or more entities (e.g., key words or phrases) from the conversation input in order to enhance the understanding of what the intent pertains to. For example, if the intent in a conversation input is to buy a product, the entity may be the name of the product referenced in the conversation input.

According to one embodiment, a conversation program may provide a domain-specific chatbot. In some embodiment, the chatbot may be specialized so as to include domain knowledge regarding a specific product or service (e.g., retail product, technical support). As such, the user (e.g., customer) may engage in a conversation with the chatbot for responses to specific product or service-related queries.

In one embodiment, the conversation between the customer and the chatbot may follow an interaction model based on a dialog tree. The chatbot may use the data in the dialog tree to provide the customer with answers to specific questions and/or guide the customer to the best reference which may include the answers. According to one embodiment, the dialog tree may include scripted responses which may be returned to the customer based on one or more conditions set by the identified intent in the user utterance.

Building the dialog tree (e.g., conditions and corresponding example responses), and particularly, identifying relevant content for generating the responses, may be a time-consuming component of chatbot deployment. Existing approaches consist of collecting unstructured data (e.g., whitepapers, technical manuals) from product owners or subject matter experts with deep knowledge of the product or business and combing through the mass of information to identify the relevant content for generating customer-facing responses for each potential intent of the customer utterance. A team of writers may need several days or weeks to curate the information in order to create accurate responses for each potential intent. The above-illustrated problem of identifying relevant content for a given intent may slow down or delay the entire the chatbot deployment process.

Current content recommendation engines rely on search techniques that use Boolean search phrases. These Boolean-based content recommendation engines may not provide high-quality content because customer utterances may contain different keywords than those used in the answers. Other approaches rely on linguistic parsing methods and lack automatic classification for both the query and the content.

Therefore, it may be advantageous to, among other things, provide a way to automatically generate a natural language classifier (e.g., answer-intent classifier) which may identify the most relevant content for responding to a question, based on an identified intent expressed in the question. Using the answer-intent classifier, the conversation program may process a collection of data sources and identify the question-intents that may be answered by respective blocks of content, thereby speeding up the response creation and overall chatbot deployment process. In some instances, customer utterances may include different keywords than those used in the content of the data sources. Accordingly, it may be advantageous to identify content for responding to the customer utterance based on the intent of the customer utterance, rather than keyword-based Boolean searches.

According to one embodiment, a conversation program may receive a corpus of historical chat transcript data divided into question-answer (QA) pairs. Each question (e.g., historical question) in the corpus of historical chat transcript data may correspond to a user (e.g., customer) utterance and each answer (e.g., historical answer) in the corpus of historical chat transcript data may correspond to an agent utterance. In one embodiment, the chatbot may extract and label each question in a first set of historical chat transcript data with a question-intent. Then, the chatbot may train a question-intent classifier by providing the question-intent classifier with the questions labelled with the question-intent as training data. Thereafter, the chatbot may use the question-intent classifier to tag questions in a second set of historical chat transcript data with question-intent labels.

According to one embodiment, the conversation program may include a pre-trained question-intent classifier. As such, the conversation program may access historical chat transcripts containing tagged intent labels (e.g., question-intent labels) for each question. Then, the chatbot may extract the answers from the QA pairs of the historical chat transcripts and feed the answers and the corresponding pre-tagged question-intents as training data for an answer-intent classifier. Using the extracted answers and the pre-tagged intent labels for the respective questions, the chatbot may train the answer-intent classifier to identify the relevant question-intent for a block of content.

According to one embodiment, the conversation program may pass a collection of data sources (e.g., content-relevant whitepapers, webpages, and documents) through the answer-intent classifier. Then, the answer-intent classifier may determine which question-intents may be addressed by excerpts or content blocks in the collection of data sources. In one embodiment, the answer-intent classifier may output tuples including content blocks and corresponding relevant intents. In one embodiment, the relevant intent may include a confidence score which may be used for ranking multiple content blocks returning the same relevel intent labels. Thereafter, the conversation program may store the output tuples in a content database for user during a recommendation process.

According to one embodiment, the conversation program may leverage the stored content blocks for each intent to return the relevant content for a new question-intent. In one embodiment, the conversation program may automatically use the stored content as responses for the corresponding question-intent. In one embodiment, the conversation program may display the relevant content for the corresponding intent to the writers who may use the relevant content to generate clear and concise chatbot responses.

According to one embodiment, the conversation program may use the stored content for a recommendation engine. Instead of automatically responding with the relevant content or using the relevant content to populate chatbot responses, the conversation program may recommend the relevant content to agents during live chats with the customers. In one embodiment, the conversation program may provide an agent-assist tool which may be useful when agents do not know the answer to a particular question.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a conversation program 110a. The networked computer environment 100 may also include a server 112 that is enabled to run a conversation program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 10, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the conversation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the conversation program 110a, 110b (respectively) to train a natural language classifier (e.g., answer-intent classifier) to associate an intent expressed in an example question with an example answer that is responsive to the example question. In one embodiment, the user may also use the conversation program 110a, 110b to classify, using the trained answer-intent classifier, a content transmitted to the trained answer-intent classifier with the intent expressed in the example question in response to determining that the content includes relevant information for generating the example answer that is responsive to the example question. The system and process implemented by the conversation program 110a, 110b is explained in more detail below with respect to FIGS. 2 to 9.

Figure 2:
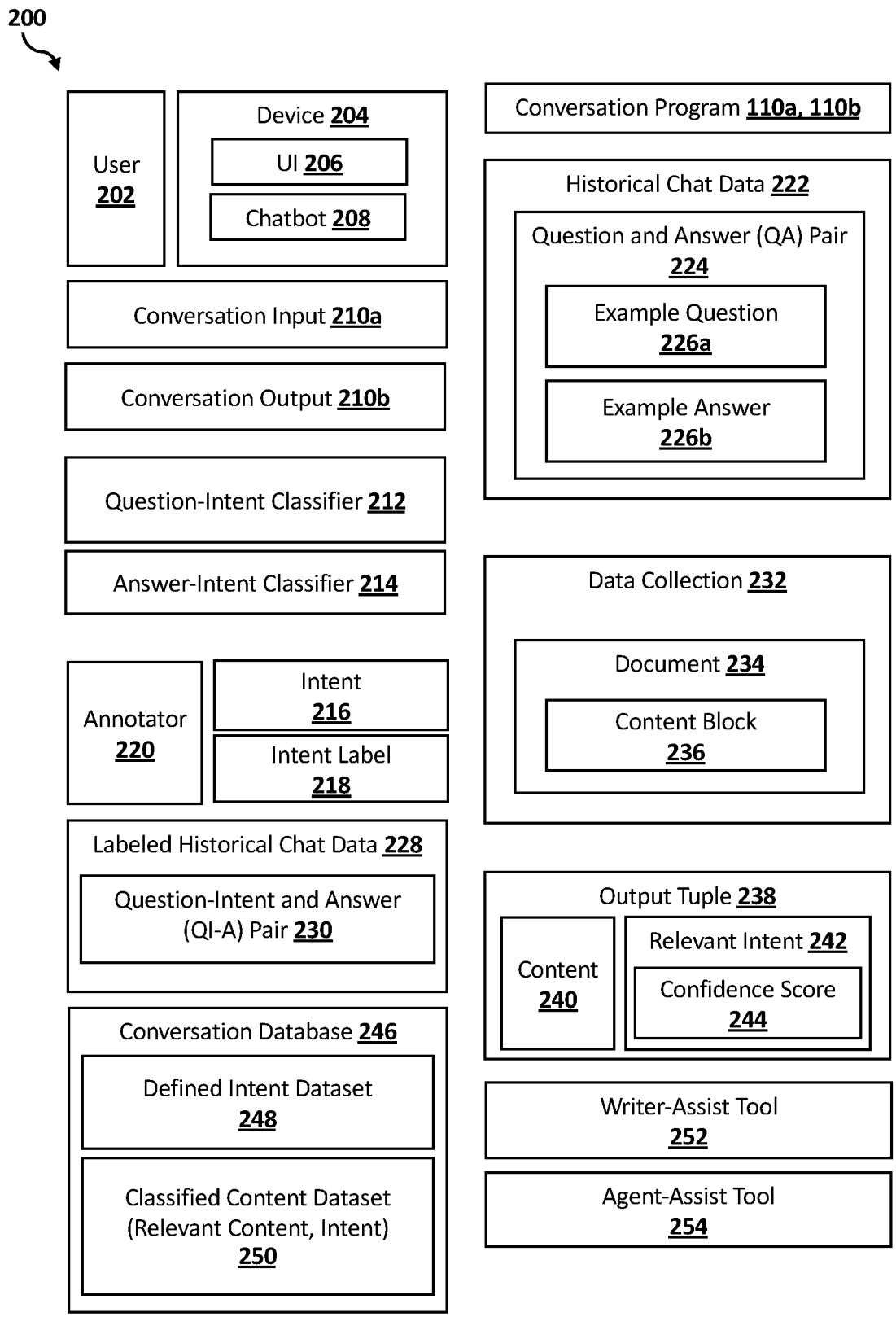
FIG. 2 is a block diagram of a cognitive system according to at least one embodiment.

Referring now to FIG. 2, a block diagram illustrating a cognitive system 200 according to at least one embodiment is depicted.

According to one embodiment, the cognitive system 200 may be provided in the networked computer environment 100 and may be implemented on one or more client computers 102 and/or one or more server computers 112 to determine a relevant content for responding to a user utterance, based on an identified intent of the user utterance.

The cognitive system 200 may generally include the conversation program 110a, 110b. More specifically, the cognitive system 200 may include the following: a user 202; a device 204 respective to the user 202; a user interface (UI) 206 of the device 204; a chatbot 208 (e.g., an instance of the conversation program 110a, 110b) running on the device 204; a conversation input 210a; a conversation output 210b; a question-intent classifier 212; an answer-intent classifier 214; an intent 216; an intent label 218; and an annotator 220; a corpus of historical chat data 222; one or more question and answer (QA) pairs 224 of the historical chat data 222 including one or more example questions 226a and one or more example answers 226b; a set of labeled historical chat data 228 divided into one or more question-intent and answer (QI-A) pairs 230; a data collection 232 comprising one or more documents 234 having one or more content blocks 236; an output tuple 238 comprising a content 240, a relevant intent 242, and a confidence score 244 associated with the relevant intent 242; a conversation database 246 including a defined intent dataset 248 and a classified content dataset 250; a writer-assist tool 252; and an agent-assist tool 254.

According to one embodiment, the conversation program 110a, 110b may be implemented on one or more client computers 102 and/or one or more server computers 112. In one embodiment, the conversation program 110a, 110b may include a single computer program or multiple program modules or sets of instructions being executed by the processor of the client computer 102/server computer 112. The conversation program 110a, 110b may include routines, objects, components, units, logic, data structures, and actions that may perform particular tasks or implement particular abstract data types. The conversation program 110a, 110b may be practiced in distributed cloud computing environments where tasks are performed by remote processing devices that may be linked through a communication network (e.g., communication network 116).

According to one embodiment, the cognitive system 200 may enable question processing and answer generation for one or more users 202 interacting with the chatbot 208 of the conversation program 110a, 110b running on the respective devices 204. In one embodiment, the users 202 may include clients or customers and the respective devices 204 may include a mobile device, a kiosk, a car dashboard, a voice response unit, or any other form factor of client computer 102. In embodiments, the user 202 may interact with the device 204 via the UI 206. According to one embodiment, the UI 206 may include a web interface or a graphical user interface (GUI) configured to display (e.g., output) graphical or textual data from the chatbot 208 running on the device 204. In one embodiment, the UI 206 may also provide an input device to enable the user 202 to interact with the chatbot 208 (e.g., by entering conversation input 210a or selecting user options) running on the device 204.

According to one embodiment, the conversation program 110a, 110b may implement the chatbot 208 as a frontend application (e.g., web application). In some embodiments, the conversation program 110a, 110b may integrate the chatbot 208 into a customer support website where the customer may interact (e.g., select) with a button, icon, or other the web interface (e.g., UI 206) to trigger a conversation with the chatbot 208. In other embodiments, the conversation program 110a, 110b may integrate the chatbot 208 into another existing communication channel (e.g., messaging application).

According to one embodiment, the chatbot 208 running on the device 204 may interact with the conversation program 110a, 110b, via the communication network 116. The conversation program 110a, 110b may receive the conversation input 210a from the user 202 interacting the chatbot 208 on the device 204. In one embodiment, the conversation input 210a may include a natural language question, natural language request for information, and/or a natural language request for performance of an operation. The conversation input 210a may be provided as a natural language text input (e.g., via UI 206) or a natural language speech input (e.g., via UI 206) which may be converted into the natural language text input. According to one embodiment, the cognitive system 200 may implement natural language processing (NLP), natural language understanding (NLU), and/or other machine learning techniques to extract and evaluate features of the natural language text in the conversation input 210a.

According to one embodiment, in response to the conversation input 210a, the conversation program 110a, 110b may provide the conversation output 210b via the chatbot 208 running on the device 204 of the user 202. In one embodiment, the conversation output 210b may include one or more answers to the question described in the conversation input 210a, for example, using a natural language text response or a natural language speech response. In some embodiments, the conversation output 210b may include a response to the request for information or performance of an operation described in the conversation input 210a.

According to one embodiment, the cognitive system 200 may generate the conversation output 210b (e.g., answers/response to request) to the conversation input 210a (e.g., questions/requests) based on the natural language text in the conversation input 210a and content in the data collection 232. The data collection 232 may include documents 234 which may contain relevant content or information for responding to the conversation input 210a. Document 234, as described in the present disclosure, may include any electronic text, articles, websites, or files including content blocks 236 (e.g., excerpts of text) which may have potential relevant information for a given conversation input 210a. In one embodiment, the data collection 232 may be provided for a specific domain or subject matter (e.g., software product documents). The cognitive system 200 may include multiple data collections 232, where respective data collections 232 may be provided for different domains.

According to one embodiment, the cognitive system 200 may implement natural language processing (NLP), natural language understanding (NLU), and/or other machine learning techniques to extract and evaluate features (e.g., intent 216) of the natural language text in the conversation input 210a. Based on processing the features of the conversation input 210a, the cognitive system 200 may transmit a query (e.g., via structure query language) associated with the features of the conversation input 210a to the data collection 232, to identify relevant content for responding via the conversation output 210b.

According to one embodiment, the cognitive system 200 may implement a natural language classifier, such as, for example the question-intent classifier 212 to extract and classify the intent 216 (e.g., expressed goal or purpose) of the conversation input 210a (e.g., question/request). In at least one embodiment, the question-intent classifier 212 may include algorithms such as, for example, support vector machines (SVM). As will be further detailed with reference to FIGS. 3 and 4, the cognitive system 200 may train the question-intent classifier 212 to recognize the intent 216 of the conversation input 210a by ingesting the corpus of historical chat data 222 (e.g., as a comma-separated value (CSV) file) including example questions 226a illustrating user (e.g., customer) utterances in past live-person chat transcripts. In one embodiment, the cognitive system 200 may implement the annotator 220 to tag the example question 226a with the corresponding intent label 218 (e.g., via entering the intent 216 as a value in the CSV file). In various embodiments, the annotator 220 may include a human (e.g., a knowledge engineer or other subject-matter expert) manually labeling the example question 226a with the corresponding intent label 218. In some embodiment, the annotator 220 may include a computer automatically labeling the example question 226a with the corresponding intent label 218 using rule-based or machine learning methods. The cognitive system 200 may transmit the intent labels 218 to the question-intent classifier 212 to train the question-intent classifier 212 to map example questions 226a to the corresponding intents 216. In one embodiment, the question-intent classifier 212 may be trained to recognize the most common intents 216 which are expressed in the historical chat data 222. Using the recognized intents 216, the cognitive system 200 may generate a defined intent dataset 248. In one embodiment, the defined intent dataset 248 may represent the intents 216 which the trained question-intent classifier 212 may be able to classify (e.g., recognize) in the example questions 226a of the historical chat data 222. In one embodiment, the defined intent dataset 248 may include the intents 216 and corresponding example questions 226a. The cognitive system 200 may store the defined intent dataset 248 in the conversation database 246 for use during a recommendation phase, as will be described with reference to FIG. 9.

According to one embodiment, the cognitive system 200 may implement the trained question-intent classifier 212 to generate labeled historical chat data 228 for training a natural language classifier, such as, for example the answer-intent classifier 214. Specifically, the cognitive system 200 may feed the trained question-intent classifier 212 another set of QA pairs 224 of the historical chat data 222. In response, the question-intent classifier 212 may tag the example questions 226a with intent labels 218, thereby generating the labeled historical chat data 228 including question-intent and answer (QI-A) pairs 230. Then, the cognitive system 200 may use the QI-A pairs 230 as training data to train the answer-intent classifier 214 to detect relevant content in the data collection 232 for generating the conversation output 210b (e.g., answers/responses to the conversation input 210a).

As will be further detailed with reference to FIGS. 6 and 7, the cognitive system 200 may train the answer-intent classifier 214 to automatically identify if any content blocks 236 in the document 234 may be relevant to the intent 216 of the conversation input 210a. In embodiments, the cognitive system 200 may feed the data collection 232 to the answer-intent classifier 214 and in response, the trained answer-intent classifier 214 may generate output tuples 238 identifying the relevant intents 242 that may be answered by various portions of content (e.g., content blocks 236) in various documents 234 included in the data collection 232. Specifically, the output tuple 238 may include the content 240 (e.g., associated with content blocks 236 of document 234) and the relevant intent 242 (e.g., associated with the intent label 218 in the QI-A pair 230). In one embodiment, the relevant intent 242 may include a corresponding confidence score 244 for ranking multiple pieces of content 240 which may include the same relevant intent 242.

In one embodiment, the cognitive system 200 may store the output tuples 238 as part of the classified content dataset 250 in the conversation database 246 for use during a recommendation process, as will be discussed with reference to FIG. 7. In one embodiment, the relevant content in the classified content dataset 250 may be linked to the intents 216 included in the defined intent dataset 248.

According to one embodiment, the cognitive system 200 may leverage the classified content dataset 250 in various ways during the recommendation process. In one embodiment, the conversation program 110a, 110b may automatically use the relevant content as the conversation output 210b for an identified intent 216 in the conversation input 210b. In another embodiment, the writer-assist tool 252 may display (e.g., via a display device) the relevant content to writers who may use the information to generate concise answers for the conversation output 210b. By implementing the writer-assist tool 252, the time-consuming component of chatbot building where writers may need to comb through the data collection 232 to find relevant information for responses may be eliminated. In another embodiment, the cognitive system 200 may provide the agent-assist tool 254 during live conversations between human-agents and customers (e.g., users 202). The agent-assist tool 254 may recommend the relevant content to the human-agent when the human-agent may not know the answer to a particular question (e.g., conversation input 210a) from the customer (e.g., user 202).

Accordingly, as generally described above, the cognitive system 200 may enable training the answer-intent classifier 214 using the question-intent classifier 212 and the corpus of historical chat data 222. Further, the cognitive system 200 may enable applying the answer-intent classifier 214 to a set of documents 234 of the data collection 232 for generating answers/responses (e.g., conversation output 210b) to new user questions/requests (e.g., conversation input 210a).

Figure 3:
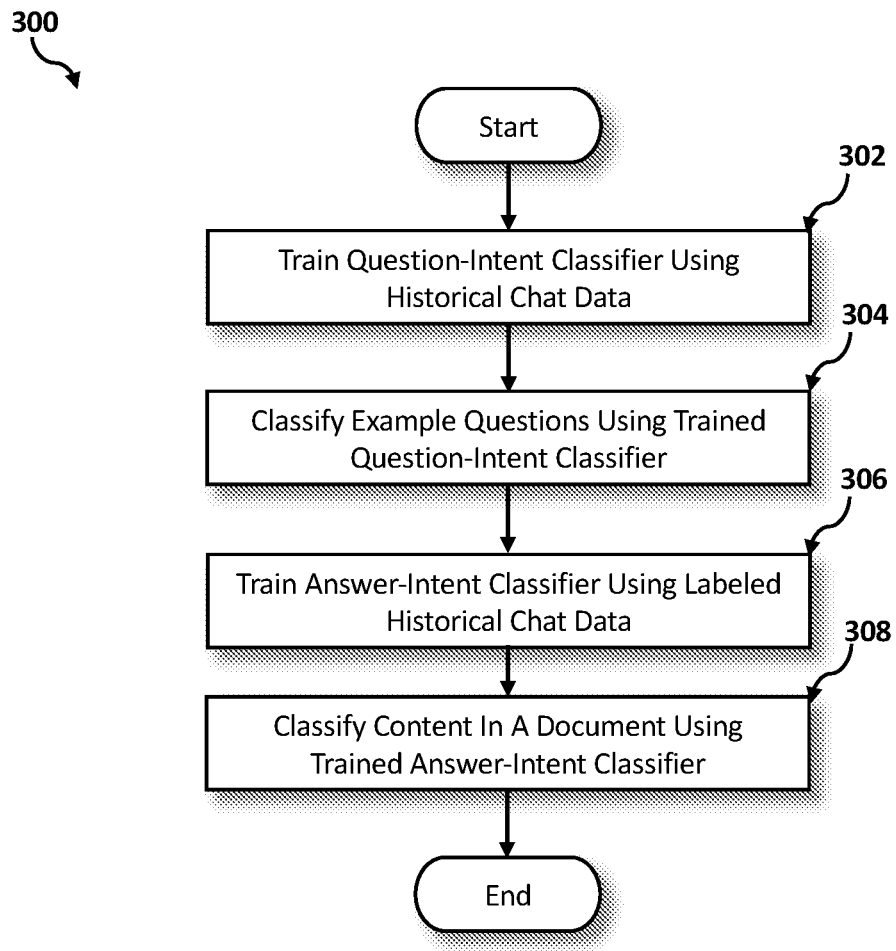
FIG. 3 is an operational flowchart illustrating a process for building an answer-intent classifier according to at least one embodiment.

Referring now to FIG. 3, an operational flowchart illustrating an exemplary process 300 for building an answer-intent classifier using the conversation program 110a, 110b according to at least one embodiment is depicted.

At 302, a question-intent classifier is trained using historical chat data, as will be further detailed with reference to FIG. 4. Then at 304, example questions are classified using the trained question-intent classifier, as will be further detailed with reference to FIG. 5. Then at 306, an answer-intent classifier is trained using labeled historical chat data, as will be further detailed with reference to FIG. 6. Then at 308, content in a document is classified using the trained answer-intent classifier, as will be further detailed with reference to FIG. 7.

Figure 4:
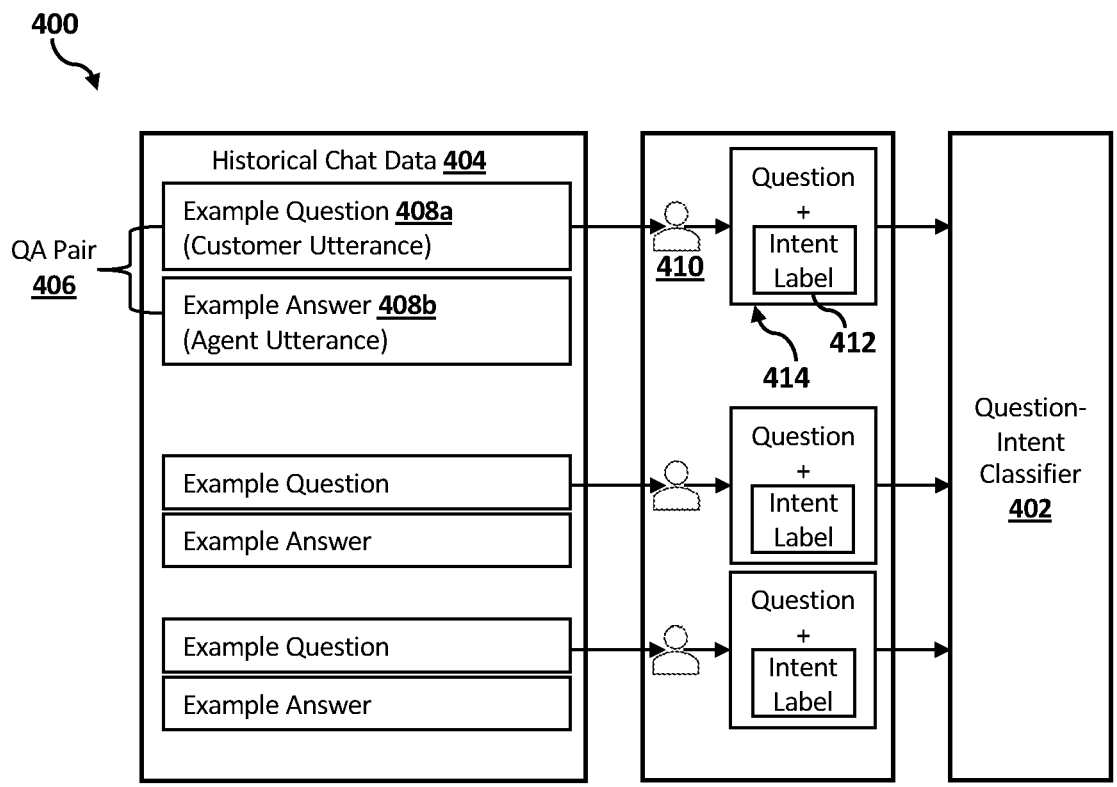
FIG. 4 is a block diagram illustrating a question-intent classifier training process according to at least one embodiment.

Referring now to FIG. 4, an exemplary block diagram 400 illustrating a question-intent classifier training process using the conversation program 110a, 110b according to at least one embodiment is depicted.

Generally, in one embodiment, the conversation program 110a, 110b may receive a first set of historical chat data including a first set of example questions. Then, the conversation program 110a, 110b may assign a respective intent label to each first example question in the first set of example questions. Thereafter, the conversation program 110a, 110b may train the question-intent classifier using the first set of example questions and the assigned respective intent labels.

More specifically, according to one embodiment, the conversation program 110a, 110b may train a question-intent classifier 402 using a set of historical chat data 404 (e.g., first set of historical chat data). In at least one embodiment, the set of historical chat data 404 may include historic human-to-human chat transcripts so that the question-intent classifier 402 may be trained using actual customer utterances and the diverse ways in which customers seek the same information, rather than, synthetic utterances created by internal subject matter experts. As previously described with reference to FIG. 2 (e.g., historical chat data 222), the set of historical chat data 404 may be divided into one or more QA pairs 406, each QA pair 406 including an example question 408a (e.g., first example question) and an example answer 408b (e.g., first example answer). In at least one embodiment, the example question 408a and the example answer 408b, may represent the customer utterance and the agent utterance (respectively), from an actual human-to-human chat transcript. According to one embodiment, the set of historical chat data 404 may include any number of QA pairs 406 having respective example questions/answers 408a, 408b, only one of which is numerically referenced in FIG. 4.

According to one embodiment, after receiving the set of historical chat data 404, the conversation program 110a, 110b may extract the example questions 408a out of the QA pairs 406 for intent labeling. In one embodiment, the conversation program 110a, 110b may provide the extracted example questions 408a to one or more annotators 410 for assigning (e.g., manually) intent labels 412 as previously described with reference to FIG. 2. In one embodiment, the annotator 410 may enter the intent label 412 as a value assigned to the corresponding example question 408a (e.g., in a .CSV file) and input the question (e.g., example question 408a) and intent label 412 as a training data 414 into the conversation program 110a, 110b. In some embodiments, the annotator 410 may include a rule-based or machine-learning based device which may automatically determine and enter the intent labels 412 to generate the training data 414. Thereafter, the conversation program 110a, 110b may transmit the training data 414 (e.g., combination of question and intent label 412) to the question-intent classifier 402 in order to train the question-intent classifier 402 to associate the example question 408a with the corresponding intent label 412.

For example, the annotator 410 may analyze the example question 408a "what is the price for this product?" and determine the intent label 412 to be "pricing." Thereafter, the conversation program 110a, 110b may train the question-intent classifier 402 to associate "what is the price for this product?" and other similar customer utterances (e.g., using other example questions) with the "pricing" intent.

Figure 5:
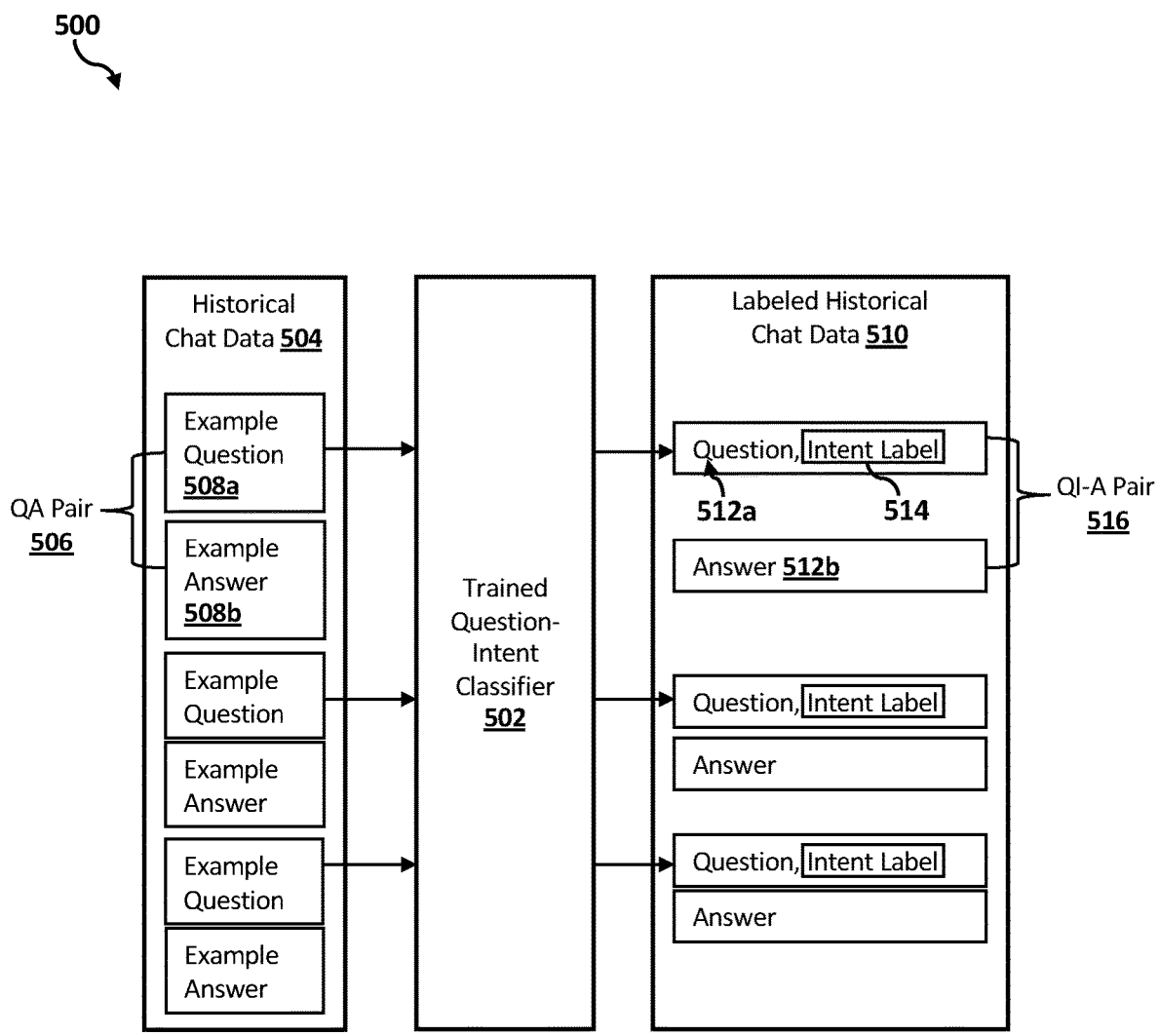
FIG. 5 is a block diagram illustrating a classifying process using a trained question-intent classifier according to at least one embodiment.

Referring now to FIG. 5, an exemplary block diagram 500 illustrating a classifying process using a trained question-intent classifier of the conversation program 110a, 110b according to at least one embodiment is depicted.

Generally, in one embodiment, the conversation program 110a, 110b may receive a second set of historical chat data including a second set of example questions. Then, the conversation program 110a, 110b may implement the trained question-intent classifier to classify each second example question in the second set of example questions with the respective intent label. Thereafter, the conversation program 110a, 110b may implement the trained question-intent classifier to generate a labeled historical chat data including the respective intent label tagged to each second example question of the second set of example questions.

More specifically, according to one embodiment, the conversation program 110a, 110b may implement a trained question-intent classifier 502 (e.g., pre-trained on questions with labeled intents at 302 of process 300 and detailed in FIG. 4), to classify example questions in another set of historical chat data. More specifically, the conversation program 110a, 110b may receive a set of historical chat data 504 (e.g., second set of historical chat data) comprising past human-to-human chat transcripts divided into QA pairs 506 having example questions 508a (e.g., second example questions) and example answers 508b (e.g., second example answers). According to one embodiment, the set of historical chat data 504 may include any number of QA pairs 506 having respective example questions/answers 508a, 508b, only one of which is numerically referenced in FIG. 5.

In one embodiment, the conversation program 110a, 110b may transmit the received set of historical chat data 504 to the trained question-intent classifier 502. In response, the trained question-intent classifier 502 may output a labeled historical chat data 510. According to one embodiment, the labeled historical chat data 510 may include questions 512*a* corresponding to example questions 508*a* in the historical chat data 504 and answers 512*b* corresponding to example answers 508*b* in the historical chat data 504. In addition, the label historical chat data 510 may include intent labels 514 associated with corresponding questions 512*a*. The trained question-intent classifier 502 may tag the questions 512*a* with corresponding intent labels 514 to classify and indicate the intents expressed therein. Accordingly, the trained question-intent classifier 502 may receive QA pairs 506 and output (question intent answer) QI-A pairs 516.

For example, the trained question-intent classifier 502 may receive the example question 508*a* "how much do I have to pay for this product?" Based on the training process at 302, the trained question-intent classifier 502 may understand that the example question 508*a* "how much do I have to pay for this product?" is similar to the example question 408*a* "what is the price for this product?" and may determine the intent label 514 to be "pricing." Thereafter, the trained question-intent classifier 502 may tag the question 512*a* "how much do I have to pay for this product?" with the intent label 514 "pricing" and output the QI-A pair 516 in the labeled historical chat data 510.

Figure 6:
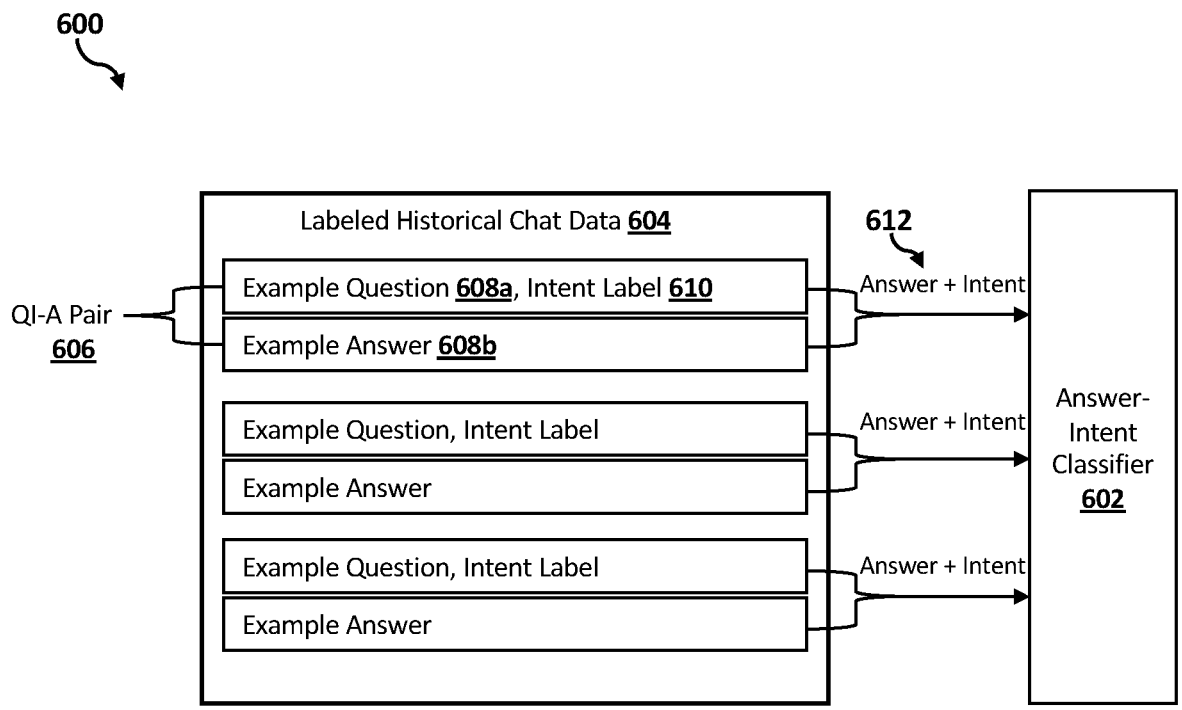
FIG. 6 is a block diagram illustrating an answer-intent classifier training process according to at least one embodiment.

Referring now to FIG. 6, an exemplary block diagram 600 illustrating an answer-intent classifier training process using the conversation program 110*a*, 110*b* according to at least one embodiment is depicted.

Generally, in one embodiment, the conversation program 110*a*, 110*b* may train an answer-intent classifier to associate an intent expressed in an example question with an example answer that is responsive to the example question. The conversation program 110*a*, 110*b* may receive a labeled chat data and may extract a set of intent labels assigned to a set of example questions and a set of example answers corresponding to the set of example questions. Then, the conversation program 110*a*, 110*b* may generate a set of training data including the set of example answers and the set of intent labels. Thereafter, the conversation program 110*a*, 110*b* may implement the generated set of training data to train the answer-intent classifier to map the example answer to an intent label (e.g., indicating the intent expressed in the example question) assigned to the example question corresponding to the example answer.

More specifically, according to one embodiment, the conversation program 110*a*, 110*b* may train an answer-intent classifier 602 using a set of labeled historical chat data 604 to identify relevant content for a corresponding question. In one embodiment, the conversation program 110*a*, 110*b* may receive the labeled historical chat data 604, similar to the labeled historical chat data 510 generated by the trained question-intent classifier 502 in FIG. 5. According to at least one embodiment, the labeled historical chat data 604 may include one or more QI-A pairs 606 including example questions 608*a*, example answers 608*b*, and intent labels 610 (e.g., pre-tagged question-intent) corresponding to the example questions 608*a*. In one embodiment, the conversation program 110*a*, 110*b* may extract out the example answers 608*b* and the intent labels 610 from each QI-A pair 606 and generate a training data 612 (e.g., answer/intent training data) including the example answer 608*b* and the intent label 610. In one embodiment, the conversation program 110*a*, 110*b* may transmit the training data 612 to the answer-intent classifier 602 to train the answer-intent classifier 602 to map an answer to a given question to an intent expressed in the given question. According to one embodiment, the answer-intent classifier 602 may be trained to identify a relevant question-intent (e.g., intent indicated by intent label 610) for a piece of content including the answer (e.g., example answer 608*b*). By associating the answer to the intent, the conversation program 110*a*, 110*b* may implement the trained answer-intent classifier 602 to detect relevant information in a data collection (e.g., data collection 232) for answering a given question based on the intent of the given question. The answer-intent classifier 602, if fed a page of data by the conversation program 110*a*, 110*b*, may be implemented to identify what intents are answered by various portions (e.g., content) of the page, as will be further described below.

For example, in a given QI-A pair 606, the example question 608*a* may recite "how much do I have to pay for this product?", the example answer 608*b* may recite "$500," and the intent label 610 may recite "pricing." The conversation program 110*a*, 110*b* may generate the training data 612 to include the answer "$500" and the intent "pricing" and may transmit the generated training data 612 to the answer-intent classifier 602. In this example, the conversation program 110*a*, 110*b* may train the answer-intent classifier 602 to identify "pricing" as the intent associated with any content including the relevant information to answer "$500" as the cost of the product.

Figure 7:
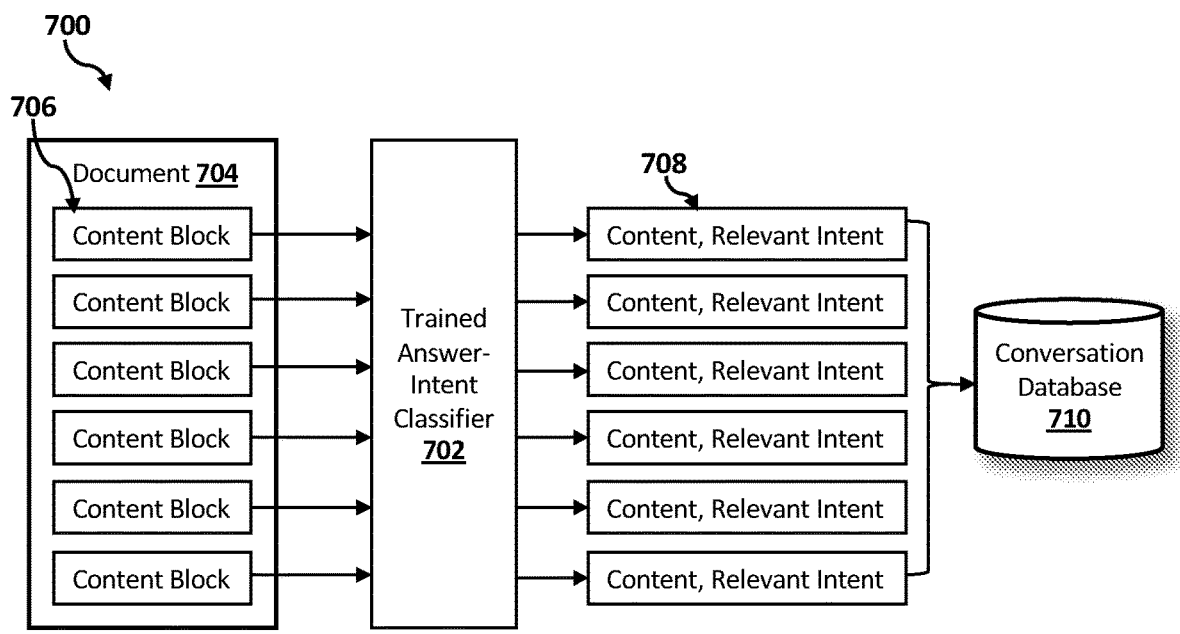
FIG. 7 is a block diagram illustrating a classifying process using a trained answer-intent classifier according to at least one embodiment.

Referring now to FIG. 7, an exemplary block diagram 700 illustrating a classifying process using a trained answer-intent classifier of the conversation program 110*a*, 110*b* according to at least one embodiment is depicted.

Generally, in one embodiment, the conversation program 110*a*, 110*b* may transmit a content to the trained answer-intent classifier. Then, if the trained answer-intent classifier determines that the content includes relevant information for generating an example answer that is responsive to an example question, the conversation program 110*a*, 110*b* may use the trained answer-intent classifier to classify the content with an intent expressed in the example question. Thereafter, the conversation program 110*a*, 110*b* may store the classified content mapped to the intent expressed in the example question in a classified content dataset.

More specifically, according to one embodiment, the conversation program 110*a*, 110*b* may implement a trained answer-intent classifier 702 to classify a content with a relevant intent. In one embodiment, the conversation program 110*a*, 110*b* may pass a document 704 from a data collection through the trained answer-intent classifier 702 which may be trained to identify a relevant question-intent (e.g., relevant intent) for a content block 706 (e.g., piece of content; excerpt) in the document 704.

According to one embodiment, the document 704, similar to documents 234 of FIG. 2, may include content blocks 706 having relevant content or information for responding to a conversation input (e.g., question). The trained answer-intent classifier 702 may analyze the content blocks 706 in the document 704 and may output one or more output tuples 708. In one embodiment, the output tuple 708 may include the content (e.g., content 240) corresponding to the content block 706 and the relevant intent (e.g., relevant intent 242) identified by the trained answer-intent classifier 702. In one embodiment, the output tuple 708 may include a confidence score (e.g., confidence score 244) associated with the relevant intent. The conversation program 110*a*, 110*b* may use the confidence score to rank content blocks 706 that return the same relevant intent in the output tuples 708. After processing the output tuple 708, the conversation program 110*a*, 110*b* may store the output tuple 708 as part of a classified content dataset (e.g., classified content dataset 250) in a conversation database 710 for use during a recommendation process, as will be further described with reference to FIGS. 8 and 9.

For example, the conversation program 110a, 110b may feed the trained answer-intent classifier 702 a set of webpages (e.g., document 704) regarding a product X. The trained answer-intent classifier 702 may analyze (e.g., using NLP) a content block A (e.g., content block 706) in the set of webpages and determine that content block A includes information relevant to the cost of product X. Specifically, the trained answer-intent classifier 702 may determine that content block A may address answers to questions expressing "pricing" as the intent thereof. Accordingly, the trained answer-intent classifier 702 may generate an output tuple 708 including the content of content block A or a pointer to content block A, as well as the relevant intent "pricing." Then, the conversation program 110a, 110b may store the output tuple 708 in the conversation database 710.

Figure 8:
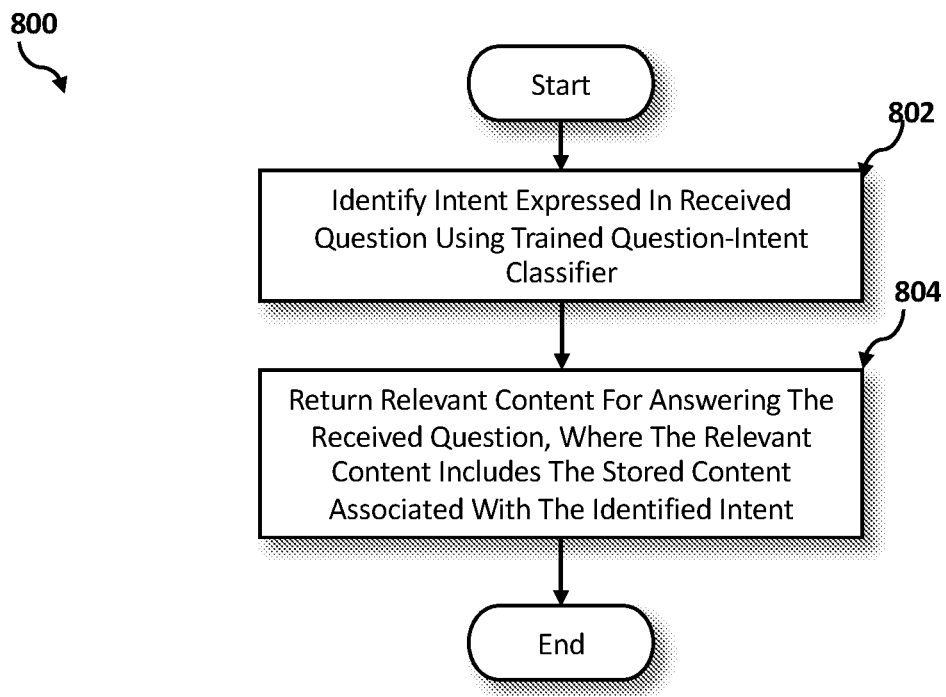
FIG. 8 is an operational flowchart illustrating a recommendation process according to at least one embodiment.

Referring now to FIG. 8, an operational flowchart illustrating an exemplary recommendation process 800 using the conversation program 110a, 110b according to at least one embodiment is depicted.

At 802, an intent of a received question is identified using a trained question-intent classifier, as previously described with reference to FIGS. 2, 4, and 5. Then at 804, a relevant content is returned from the classified content dataset, where the relevant content includes the stored content associated with the identified intent, as previously described with reference to FIGS. 2, 6, and 7, and further described below with reference to FIG. 9.

Figure 9:
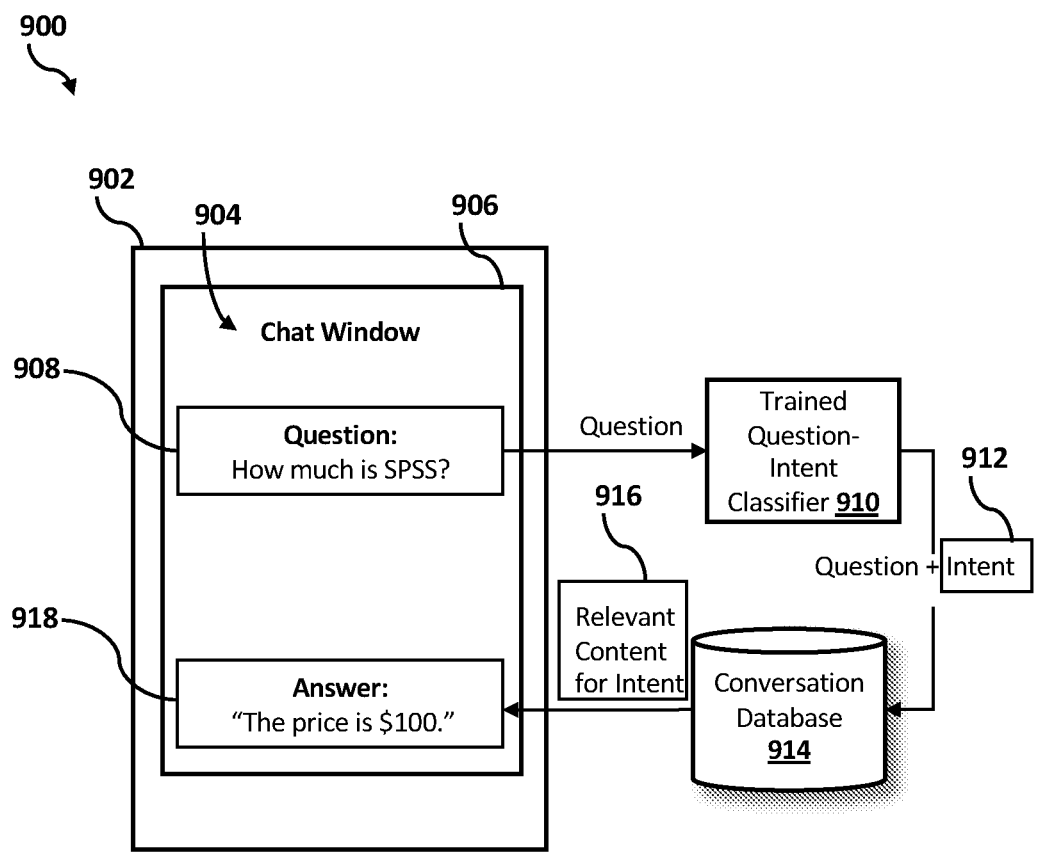
FIG. 9 is a block diagram illustrating an exemplary recommendation process according to at least one embodiment.

Referring now to FIG. 9, a block diagram 900 illustrating an exemplary recommendation process using the conversation program 110a, 110b according to at least one embodiment is depicted.

According to one embodiment, the conversation program 110a, 110b running on a device 902 may provide a chatbot 904. A user may interact with a UI 906 of the device 902 to enter a question 908 for the chatbot 904. In one embodiment, the conversation program 110a, 110b may receive the question 908 (e.g., conversation input 210a) from the device 902 and pass the question 908 through a question-intent classifier 910.

For example, a customer may interact with the UI 906 of the device 902 to enter the question 908 "How much is SPSS?" for the chatbot 904. After receiving the question 908, the conversation program 110a, 110b may pass the question 908 "How much is SPSS?" through the question-intent classifier 910.

In one embodiment, the question-intent classifier 910 may be pre-trained to identify an intent expressed in the question 908. As such, in response to receiving the question 908, the question-intent classifier 910 may output the question and a corresponding identified intent 912.

Continuing with the previous example, the question-intent classifier 910 may output the question "How much is SPSS?" and the identified intent 912 "pricing."

Then, in one embodiment, the conversation program 110a, 110b may transmit a query to a conversation database 914 (e.g., conversation database 246) including the question and the identified intent 912. In one embodiment, the conversation database 914 may include a classified content dataset (e.g., classified content dataset 250) and a defined intent dataset (e.g., defined intent dataset 248). According to one embodiment, the conversation program 110a, 110b may use the trained question-intent classifier to generate the defined intent dataset including a plurality of intents recognized by the trained question-intent classifier. In one embodiment, the conversation program 110a, 110b may use the trained answer-intent classifier to generate the classified content dataset including at least one relevant content (e.g., stored content) mapped to each intent of the plurality of intents in the defined intent dataset.

In response to the query including the question and the identified intent 912, the conversation database 914 may return a relevant content for intent 916 (e.g., relevant content) from the stored content. In one embodiment, if the classified content dataset included more than one content linked to the identified intent 912, the conversation program 110a, 110b may rank the content based on the confidence score associated with the intent. Then, the conversation program 110a, 110b may return as the relevant content 916, the content where the intent had the highest confidence score.

Continuing with the previous example, the conversation program 110a, 110b may identify a content block A in the classified content dataset of the conversation database 914 linked to the "pricing" intent. As such, the conversation database 914 may return the information in the content block A as the relevant content 916 for the identified intent 912. Then, the conversation program 110a, 110b may use the chatbot 904 to automatically generate and return "The price is $100." as the answer 918 from the relevant content 916.

According to one embodiment, the conversation program 110a, 110b may enable the chatbot 904 to automatically use the relevant content 916 from the conversation database 914 as an answer 918 (e.g., conversation output 210b) to the question 908, as shown in FIG. 9. According to other embodiments, the conversation program 110a, 110b may include a writer-assist tool (e.g., writer-assist tool 252) and an agent-assist tool (e.g., agent-assist tool 254) which may leverage the stored content in the classified content dataset of the conversation database, as described previously with reference to FIG. 2. The writer-assist tool may enable writers to use the relevant content 916 to generate concise answers 918 for the question 908. The agent-assist tool may enable human-agents to respond to questions 908 using the relevant content 916, when the answer 918 to the question 908 may be otherwise unknown to the human-agent.

The functionality of a computer may be improved by the conversation program 110a, 110b because the conversation program 110a, 110b may enable the computer to automatically generate a natural language classifier which may improve the information retrieval process of the computer. The conversation program 110a, 110b may enable the computer to automatically train an answer-intent classifier using a question-intent classifier and a corpus of historical chat data. Thereafter, the conversation program 110a, 110b may enable the computer to retrieve content (from a new set of documents) more efficiently, using the trained answer-intent classifier, for generating responses to a new query.

It may be appreciated that FIGS. 2 to 9 provide only an illustration of one embodiment and do not imply any limitations with regard to how different embodiments may be implemented. Many modifications to the depicted embodiment(s) may be made based on design and implementation requirements.

Figure 10:
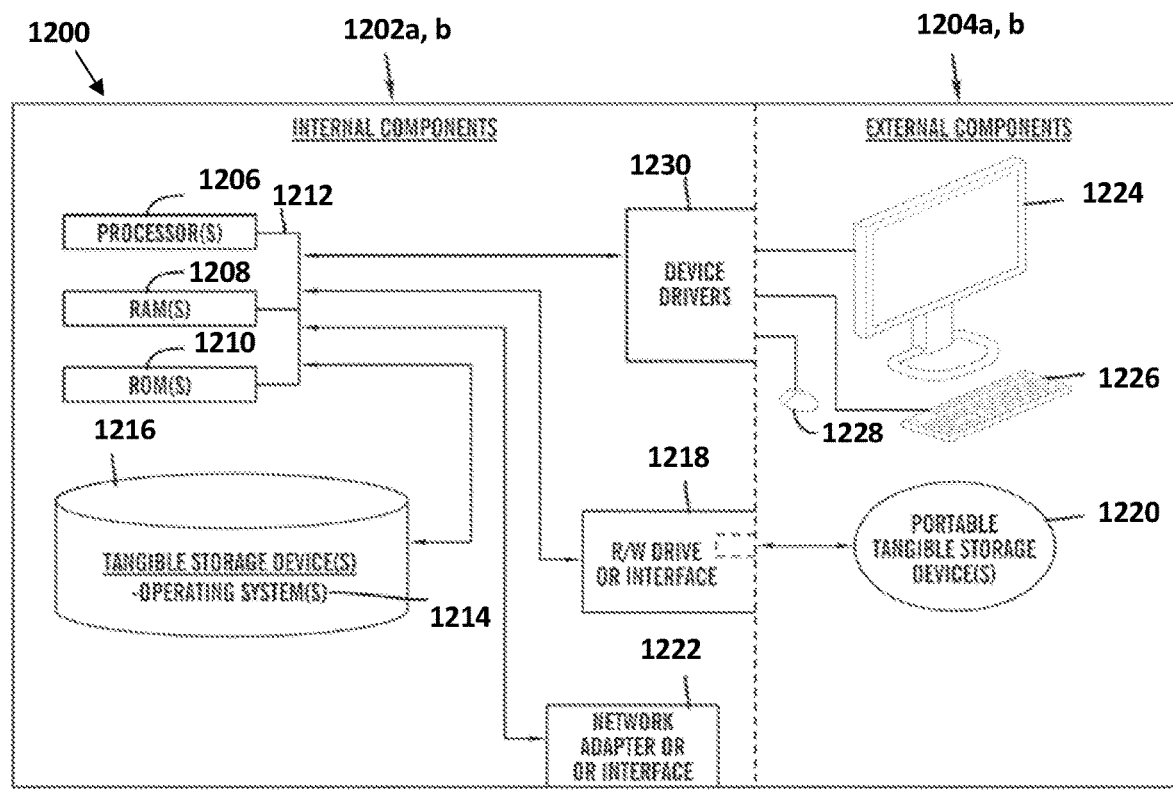
FIG. 10 is a block diagram of internal and external components of computers and servers depicted in FIG. 1 according to at least one embodiment.

FIG. 10 is a block diagram 1200 of internal and external components of computers depicted in FIG. 1 in accordance with an illustrative embodiment of the present invention. It should be appreciated that FIG. 10 provides only an illustration of one implementation and does not imply any limitations with regard to the environments in which different embodiments may be implemented. Many modifications to the depicted environments may be made based on design and implementation requirements.

Data processing system 1202, 1204 is representative of any electronic device capable of executing machine-readable program instructions. Data processing system 1202, 1204 may be representative of a smart phone, a computer system, PDA, or other electronic devices. Examples of computing systems, environments, and/or configurations that may represented by data processing system 1202, 1204 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

User client computer 102 and network server 112 may include respective sets of internal components 1202a, b and external components 1204a, b illustrated in FIG. 10. Each of the sets of internal components 1202a, b includes one or more processors 1206, one or more computer-readable RAMs 1208 and one or more computer-readable ROMs 1210 on one or more buses 1212, and one or more operating systems 1214 and one or more computer-readable tangible storage devices 1216. The one or more operating systems 1214, the software program 108, and the conversation program 110a in client computer 102, and the conversation program 110b in network server 112, may be stored on one or more computer-readable tangible storage devices 1216 for execution by one or more processors 1206 via one or more RAMs 1208 (which typically include cache memory). In the embodiment illustrated in FIG. 10, each of the computer-readable tangible storage devices 1216 is a magnetic disk storage device of an internal hard drive. Alternatively, each of the computer-readable tangible storage devices 1216 is a semiconductor storage device such as ROM 1210, EPROM, flash memory or any other computer-readable tangible storage device that can store a computer program and digital information.

Each set of internal components 1202a, b also includes a R/W drive or interface 1218 to read from and write to one or more portable computer-readable tangible storage devices 1220 such as a CD-ROM, DVD, memory stick, magnetic tape, magnetic disk, optical disk or semiconductor storage device. A software program, such as the software program 108 and the conversation program 110a and 110b can be stored on one or more of the respective portable computer-readable tangible storage devices 1220, read via the respective R/W drive or interface 1218 and loaded into the respective hard drive 1216.

Each set of internal components 1202a, b may also include network adapters (or switch port cards) or interfaces 1222 such as a TCP/IP adapter cards, wireless wi-fi interface cards, or 3G or 4G wireless interface cards or other wired or wireless communication links. The software program 108 and the conversation program 110a in client computer 102 and the conversation program 110b in network server computer 112 can be downloaded from an external computer (e.g., server) via a network (for example, the Internet, a local area network or other, wide area network) and respective network adapters or interfaces 1222. From the network adapters (or switch port adaptors) or interfaces 1222, the software program 108 and the conversation program 110a in client computer 102 and the conversation program 110b in network server computer 112 are loaded into the respective hard drive 1216. The network may comprise copper wires, optical fibers, wireless transmission, routers, firewalls, switches, gateway computers and/or edge servers.

Each of the sets of external components 1204a, b can include a computer display monitor 1224, a keyboard 1226, and a computer mouse 1228. External components 1204a, b can also include touch screens, virtual keyboards, touch pads, pointing devices, and other human interface devices. Each of the sets of internal components 1202a, b also includes device drivers 1230 to interface to computer display monitor 1224, keyboard 1226 and computer mouse 1228. The device drivers 1230, R/W drive or interface 1218 and network adapter or interface 1222 comprise hardware and software (stored in storage device 1216 and/or ROM 1210).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
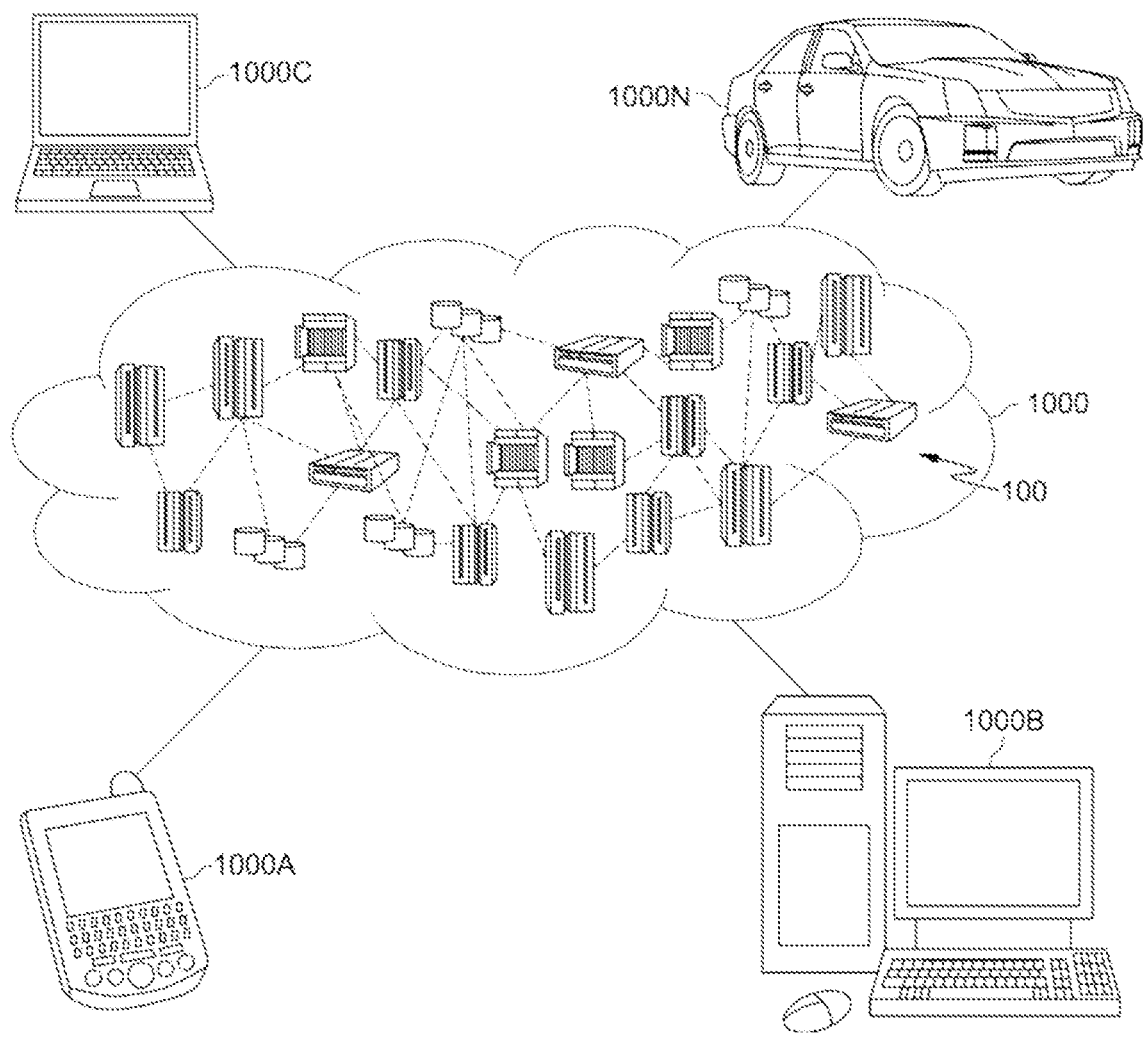
FIG. 11 is a block diagram of an illustrative cloud computing environment including the computer system depicted in FIG. 1, in accordance with an embodiment of the present disclosure.

Referring now to FIG. 11, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 11 are intended to be illustrative only and that computing nodes 100 and cloud computing environment 1000 can communicate with any type of computerized device over any type of network and/or network addressable connection (e.g., using a web browser).

Figure 12:
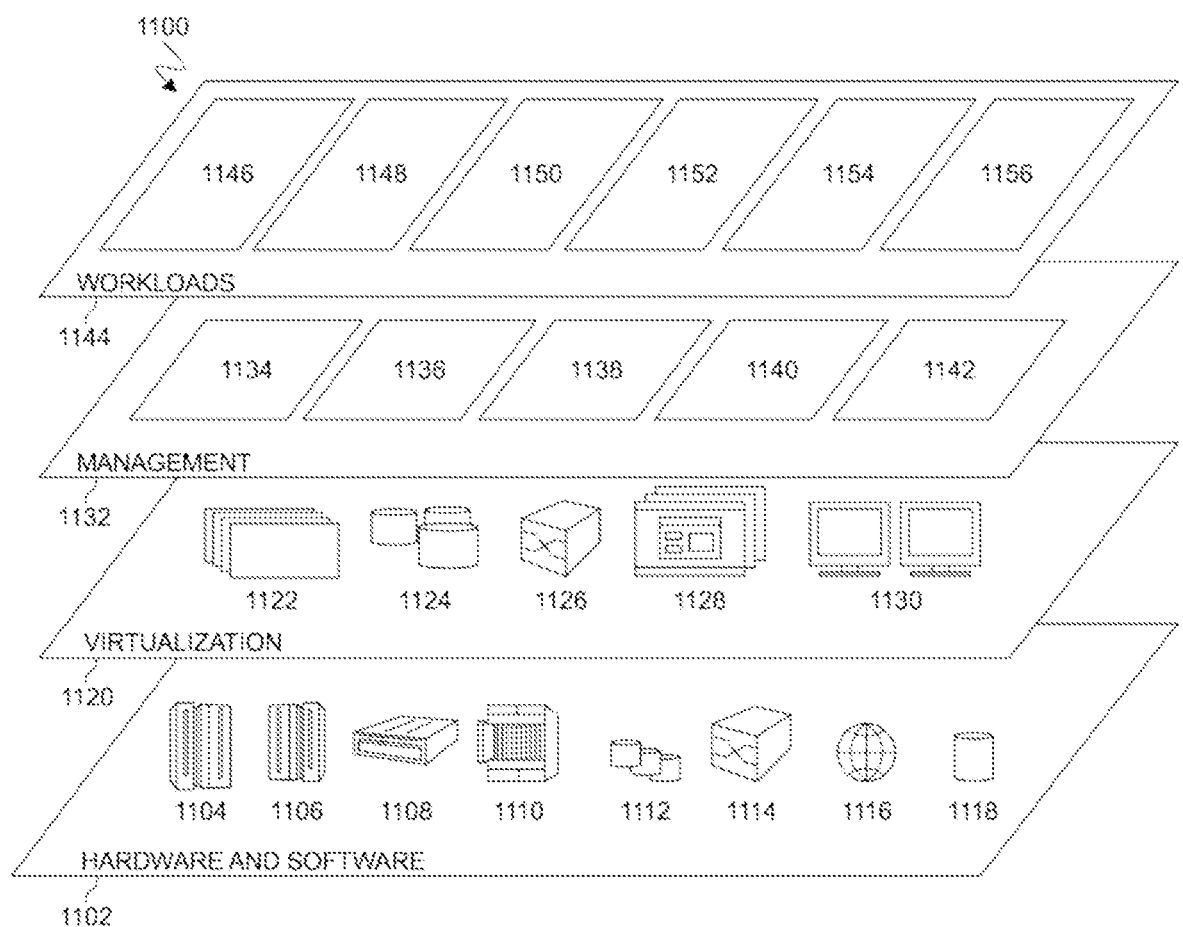
FIG. 12 is a block diagram of functional layers of the illustrative cloud computing environment of FIG. 11, in accordance with an embodiment of the present disclosure.

Referring now to FIG. 12, a set of functional abstraction layers 1100 provided by cloud computing environment 1000 is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and conversation processing 1156. A conversation program 110a, 110b provides a way to classify, using a trained answer-intent classifier, a content transmitted to the trained answer-intent classifier with an intent expressed in an example question, in response to determining, using the trained answer-intent classifier, that the content includes relevant information for generating an example answer that is responsive to the example question.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

training an answer-intent classifier to associate an intent expressed in an example question with an example answer that is responsive to the example question;

in response to determining, using the trained answer-intent classifier, that a content transmitted to the trained answer-intent classifier includes relevant information for generating the example answer that is responsive to the example question, classifying, using the trained answer-intent classifier, the content with the intent expressed in the example question; and storing the classified content associated with the intent expressed in the example question in a classified content dataset.

2. The method of claim 1, further comprising:

identifying, using a trained question-intent classifier, the intent expressed in a received question; and returning, from the classified content dataset, a relevant content for answering the received question, wherein the returned relevant content includes the stored content associated with the identified intent.

3. The method of claim 1, wherein training the answer-intent classifier to associate the intent expressed in the example question with the example answer that is responsive to the example question further comprises:

extracting, from a labeled historical chat data, a set of intent labels assigned to a set of example questions and a set of example answers corresponding to the set of example questions;

generating a set of training data including the set of example answers and the set of intent labels; and training the answer-intent classifier, using the generated set of training data, to map the example answer to an intent label assigned to the example question corresponding to the example answer, wherein the intent label indicates the intent expressed in the example question.

4. The method of claim 1, wherein classifying the content with the intent expressed in the example question further comprises:

generating, by the trained answer-intent classifier, at least one output tuple including the content and a relevant intent indicating the intent expressed in the example question.

5. The method of claim 1, further comprising:

receiving a first set of historical chat data including a first set of example questions;

assigning a respective intent label to each first example question in the first set of example questions; and training a question-intent classifier using the first set of example questions and the assigned respective intent labels.

6. The method of claim 5, further comprising:

receiving a second set of historical chat data including a second set of example questions;

classifying, using the trained question-intent classifier, each second example question in the second set of example questions with the respective intent label; and generating, by the trained question-intent classifier, a labeled historical chat data including the respective intent label tagged to each second example question of the second set of example questions.

7. The method of claim 5, further comprising:

generating, using the trained question-intent classifier, a defined intent dataset including a plurality of intents recognized by the trained question-intent classifier; and generating, using the trained answer-intent classifier, a classified content dataset including at least one relevant content associated with each intent of the plurality of intents in the defined intent dataset.

8. The method of claim 5, wherein assigning the respective intent label to each first example question in the first set of example questions further comprises:

receiving, from an annotator, the respective intent label manually tagged to each first example question in the first set of example questions.

9. The method of claim 1, further comprising:

transmitting, to the trained answer-intent classifier, a document from a data collection, wherein the transmitted document includes at least one content block; and detecting, using the trained answer-intent classifier, the content having the relevant information for generating the example answer in the at least one content block of the transmitted document.

10. A computer system for automatically generated conversation output, comprising:

one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:

training an answer-intent classifier to associate an intent expressed in an example question with an example answer that is responsive to the example question;

in response to determining, using the trained answer-intent classifier, that a content transmitted to the trained answer-intent classifier includes relevant information for generating the example answer that is responsive to the example question, classifying, using the trained answer-intent classifier, the content with the intent expressed in the example question; and storing the classified content associated with the intent expressed in the example question in a classified content dataset.

11. The computer system of claim 10, further comprising:

identifying, using a trained question-intent classifier, the intent expressed in a received question; and returning, from the classified content dataset, a relevant content for answering the received question, wherein the returned relevant content includes the stored content associated with the identified intent.

12. The computer system of claim 10, wherein training the answer-intent classifier to associate the intent expressed in the example question with the example answer that is responsive to the example question further comprises:

extracting, from a labeled historical chat data, a set of intent labels assigned to a set of example questions and a set of example answers corresponding to the set of example questions;

generating a set of training data including the set of example answers and the set of intent labels; and training the answer-intent classifier, using the generated set of training data, to map the example answer to an intent label assigned to the example question corresponding to the example answer, wherein the intent label indicates the intent expressed in the example question.

13. The computer system of claim 10, wherein classifying the content with the intent expressed in the example question further comprises:

generating, by the trained answer-intent classifier, at least one output tuple including the content and a relevant intent indicating the intent expressed in the example question.

14. The computer system of claim 10, further comprising:
receiving a first set of historical chat data including a first set of example questions;
assigning a respective intent label to each first example question in the first set of example questions; and
training a question-intent classifier using the first set of example questions and the assigned respective intent labels.

15. The computer system of claim 14, further comprising:
receiving a second set of historical chat data including a second set of example questions;
classifying, using the trained question-intent classifier, each second example question in the second set of example questions with the respective intent label; and
generating, by the trained question-intent classifier, a labeled historical chat data including the respective intent label tagged to each second example question of the second set of example questions.

16. A computer program product for automatically generated conversation output, the computer program product comprising:
one or more computer-readable storage media and program instructions collectively stored on the one or more computer-readable storage media, the program instructions comprising:

program instructions to train an answer-intent classifier to associate an intent expressed in an example question with an example answer that is responsive to the example question;

program instructions to classify, using the trained answer-intent classifier, a content transmitted to the trained answer-intent classifier with the intent expressed in the example question in response to determining, using the trained answer-intent classifier, that the content includes relevant information for generating the example answer that is responsive to the example question; and program instructions to store the classified content associated with the intent expressed in the example question in a classified content dataset.

17. The computer program product of claim 16, further comprising:

program instructions to identify, using a trained question-intent classifier, the intent expressed in a received question; and program instructions to return, from the classified content dataset, a relevant content for answering the received question, wherein the returned relevant content includes the stored content associated with the identified intent.

* * * * *